US008555515B2

(12) United States Patent
Lien

(10) Patent No.: US 8,555,515 B2
(45) Date of Patent: Oct. 15, 2013

(54) DRY WALL HAND TOOL

(76) Inventor: Chin-Hsiung Lien, El Monte, CA (US)

( * ) Notice: Subject to any disclaimer, the term of this patent is extended or adjusted under 35 U.S.C. 154(b) by 873 days.

(21) Appl. No.: 12/288,835

(22) Filed: Oct. 22, 2008

(65) Prior Publication Data

US 2010/0095536 A1 Apr. 22, 2010

(51) Int. Cl.
*B26F 1/00* (2006.01)
*F16B 15/00* (2006.01)

(52) U.S. Cl.
USPC .............................. 30/366; 411/489; 411/498

(58) Field of Classification Search
USPC ............. 60/358, 366; 30/358, 366, 360, 324, 30/325; 411/488, 489, 498; D8/47
See application file for complete search history.

(56) References Cited

U.S. PATENT DOCUMENTS

| | | | | |
|---|---|---|---|---|
| 17,078 | A * | 4/1857 | Clement | 30/366 |
| 330,383 | A * | 11/1885 | Devore | 30/366 |
| 651,921 | A * | 6/1900 | De Vilbiss | 606/172 |
| 664,536 | A * | 12/1900 | Dickinson | 30/118 |
| 2,390,309 | A * | 12/1945 | Keys | 30/443 |
| 2,869,406 | A * | 1/1959 | Belmont | 82/1.2 |
| 4,763,546 | A * | 8/1988 | Yeh et al. | 81/15.7 |
| 4,891,887 | A * | 1/1990 | Witte | 30/366 |
| 5,117,720 | A * | 6/1992 | Bussi | 83/660 |
| D451,353 | S * | 12/2001 | Challinor | D8/47 |
| 6,484,408 | B1 * | 11/2002 | Dove | 30/360 |

* cited by examiner

*Primary Examiner* — Flemming Saether

(74) *Attorney, Agent, or Firm* — Raymond Y. Chan; David and Raymond Patent Firm

(57) ABSTRACT

An affixing pin for penetrating a dry wall includes a pusher handle and a penetrating pin. The penetrating pin has a sharp penetrating end portion, a tail end portion connected with the pusher handle, and an elongated pin body integrally extend portioned between the penetrating end portion and the tail end portion, wherein the penetrating pin has a non-circular cross section defining at least one penetrating corner having a pre-determined inclination angle between two corresponding outer surfaces of the penetrating pin; such that when the penetrating pin is rotatably pressed towards the dry wall by the pusher handle, the sharp penetrating end portion is arranged to rotatably penetrate the dry wall, in which the penetrating corner substantially assists optimally breaking the dry wall so as to maintain an optimal performance of the affixing pin in penetrating the dry wall while maintaining secure engagement between the penetrating pin and the dry wall after penetration thereof.

6 Claims, 5 Drawing Sheets

DRY WALL HAND TOOL

BACKGROUND OF THE PRESENT INVENTION

1. Field of Invention

The present invention relates to an affixing pin, and more particularly to a dry wall hand tool for penetrating into a dry wall and allowing the user to do so easily without applying as much pushing force as the conventional affixing pin requires and without using tools.

2. Description of Related Arts

Referring to FIG. 1 of the drawings, a conventional affixing pin for dry wall comprises a sharp inserting head 1, a pin body 2, and a pusher handle 3. The sharp inserting head 1, having a substantially circular cross section, is provided at a tip end portion of the pin body 2 for conveniently inserting through objects such as a dry wall. It is generally extended portioned rearwardly and conically with an increasing diameter towards the pusher handle 3 which usually is as elongated uniform cylinder shape. The sharp tip end portion allows the sharp inserting head 1 to insert into the dry wall surface then, under a tip end portion pushing action, the sharp inserting head 1 pushes the dry wall material radially to create a hole in the dry wall for the affixing pin to further insert in it. The pusher handle 3 couples with the pin body 2 coaxially and has a flat surface at one end portion for user to conveniently exert force such that the sharp inserting head 1 can penetrate through object easier. The pusher handle 3 of such conventional dry wall affixing pin usually has a twisting handle designed for user to grab on and allow the user to provide a twisting motion while inserting through a dry wall, thus rend portionering the hole-making process easier.

Moreover, there exist a number of disadvantages for this conventional affixing pin. First, although this kind of affixing pin has been commonly used for a long time, most of the modifications and improvements are limited to the pusher handle 3 for allowing an easier or more convenient grab for the user to perform the pushing or the twisting action. It is true that modification in the pusher handle 3 may improve the inserting process but not too many modifications were ever invented on the sharp inserting head 1 and pin body 2.

Second, even though the pusher handle 3 is designed and improved such that penetration of a dry wall can be achieved in the most efficient manner, it does not mean that the construction and design of the pin body 2 and the sharp inserting head 1 are such that easy and effective penetration of the pin body 2 can be ensured. Herein lays the distinction between efficiency and effectiveness. For example, one may use the maximum efficient of force to accomplish a particular penetration of a dry wall at a very low effectiveness given the construction and design of the pin body 2 and the sharp inserting head 1. In the contrary, one may accomplish a particular penetration of a dry wall in a very effective manner yet with little efficiency due to poor design of the pusher handle. Most of the improvements of conventional affixing pin such as the one described above are devoted to improvement of efficiency.

Third, almost all sharp inserting heads 1 and the pin bodies 2 of the conventional affixing pins have substantially circular cross sections. This makes penetration of the pin bodies into the dry wall very difficult and the user may even need to use some sorts of instruments for accomplishing the penetration. Since the diameter of the pin body 2 is increasing with decreasing distance from the pusher handle 3, when the penetration process is in progress, there exists gradual destruction to the dry wall, forming a hole thereon. As a matter of fact, however, when the pin body 2 has a substantially circular cross section, the dry wall will be difficult to be penetrated, and that excessive shear force will make the resulting not circular in shape, thereby loosening the supposedly fit engagement between the pin body 2 and the dry wall.

Fourth, many of such conventional affixing pins are used for hanging materials such as calendar posters, clothes, picture frame, and etc. In these applications, a hanging downward force is usually applied at the pusher handle 3 and it creates a moment only at a pivot point at the top portion of the pin body 2 against the dry wall. Another existing problem of such conventional affixing is that the pivot point is not strong enough for support if the affixing pin is hanging heavy materials thus creating a strong moment that might damage the dry wall or even make the pin head and body to slip out from the wall.

Finally, conventional affixing pins are usually allowed to rotate freely once the affixing pin is inserted into the dry wall. It is very often that the affixing pin might be experiencing different pulling or pushing forces in many different directions while hanging objects. These forces could cause the affixing pin to rotate while it is inserted into the dry wall. The rotation of the affixing pin can overcome the static friction between the pin body 2 and the dry wall material thus allowing the pin body 2 to slide easily inside the dry wall hole. Under this situation, the hanging affixing pin can slide out of the dry wall hole and fail the hanging objective.

SUMMARY OF THE PRESENT INVENTION

A main object of the invention is to provide a dry wall hand tool which requires less penetrating force for the whole affixing pin to penetrating through the wall, while at the same time maximizing the effectiveness of the penetration process.

Another object of the present invention is to provide a dry wall hand tool which is capable of effectively and efficiently penetrating into a dry wall while maintaining fit engagement between the affixing pin and the dry wall. In other words, the affixing pin will not be loosened after penetrating into the dry wall.

Another object of the present invention is to provide a dry wall hand tool which can minimize the damage of wall texture when penetrating through wall. Moreover, the affixing pin can easily penetrate the dry wall in a tool-less manner.

Another object of the invention is to provide a dry wall hand tool which the pin can function as a hanger to supportively hang objects and to provide a better hanging support.

Another object of the invention is to provide a dry wall hand tool which does not involve complicated mechanical structure so as to minimize the manufacturing cost of the present invention.

Accordingly, in order to accomplish the above object, the present invention provides a dry wall hand tool adapted for making a hole on a dry wall, comprising:

a pusher handle adapted for a user grabbing and holding thereat in a tight and stable manner; and a penetrating pin having a sharp penetrating tip, a tail end portion securely and coaxially coupling with the pusher handle, an elongated pin body integrally extended from the tail end portion to the sharp penetrating tip, and a sharp edge integrally extended along the pin body from the sharp penetrating tip to the tail end portion, in such a manner that when a pushing hand-force is applied by a hand of the user at the pusher handle coaxially towards the penetrating pin, the sharp penetrating tip of the penetrating pin is arranged to initially penetrate into the dry wall while the sharp edge of the penetrating pin is arranged to substantially assist the pin body in breaking through the dry wall to form the hole thereat in a tool-less manner.

These and other objectives, features, and advantages of the present invention will become apparent from the following detailed description, the accompanying drawings, and the append portioned claims.

DETAILED DESCRIPTION OF THE PREFERRED EMBODIMENT

Figure 1:
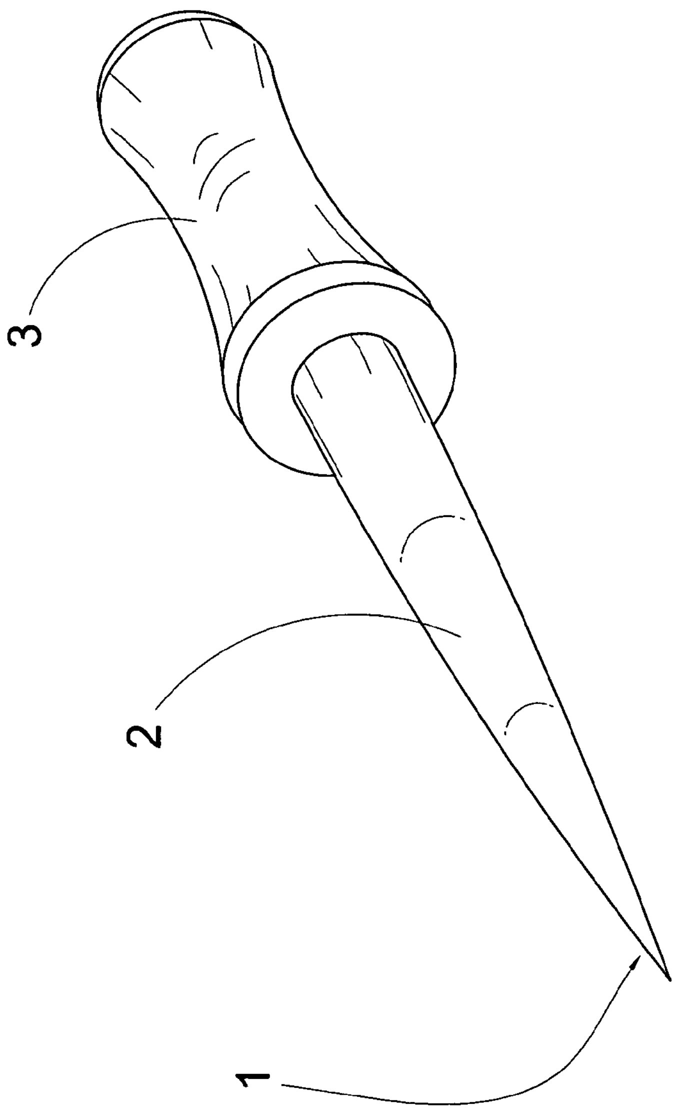
FIG.1 PRIOR ART
FIG. 1 is a conventional dry wall affixing pin.
Figure 2:
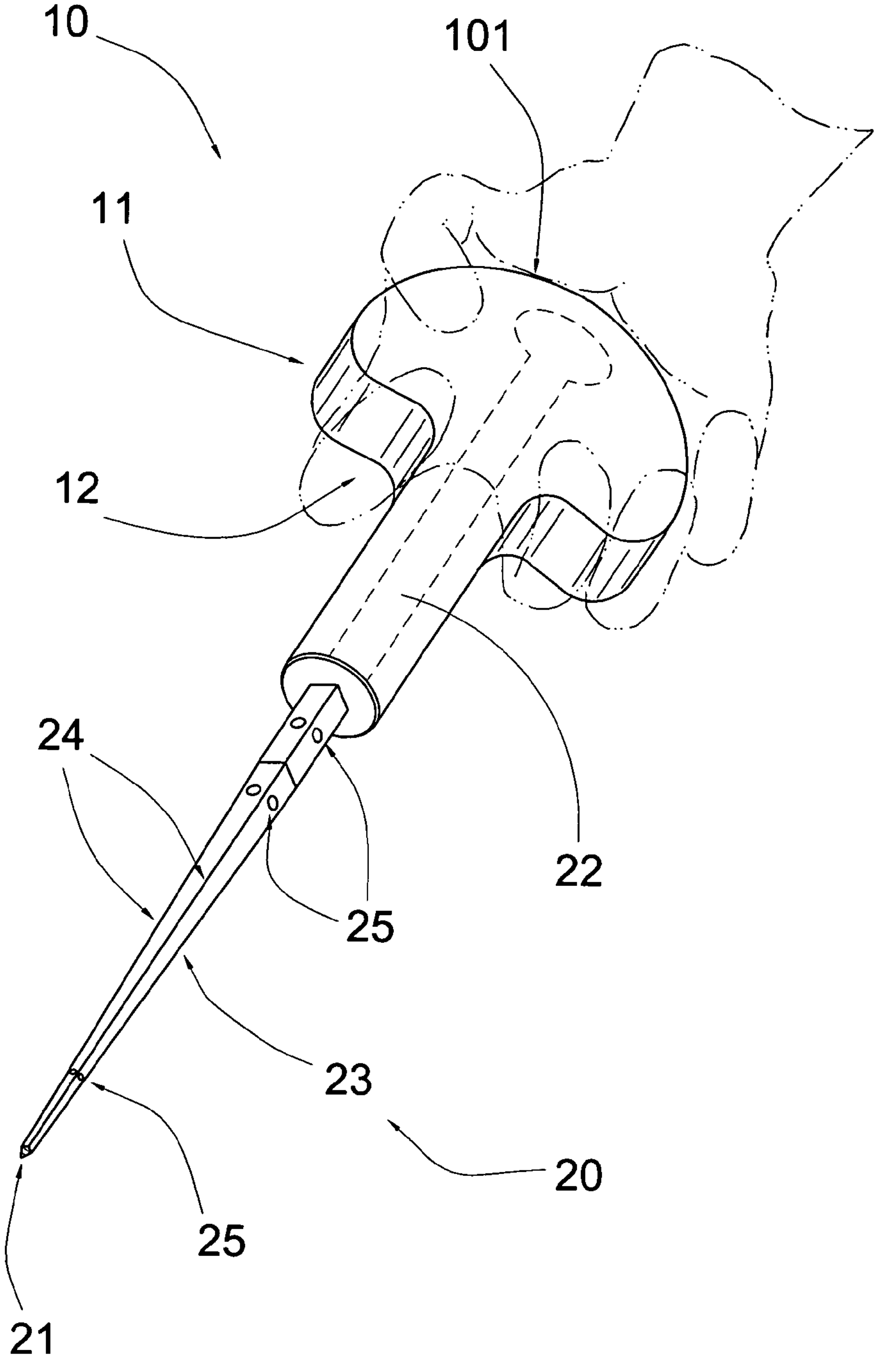
FIG. 2 is a perspective view of a dry wall hand tool according to a first preferred embodiment of the present invention.
Figure 3:
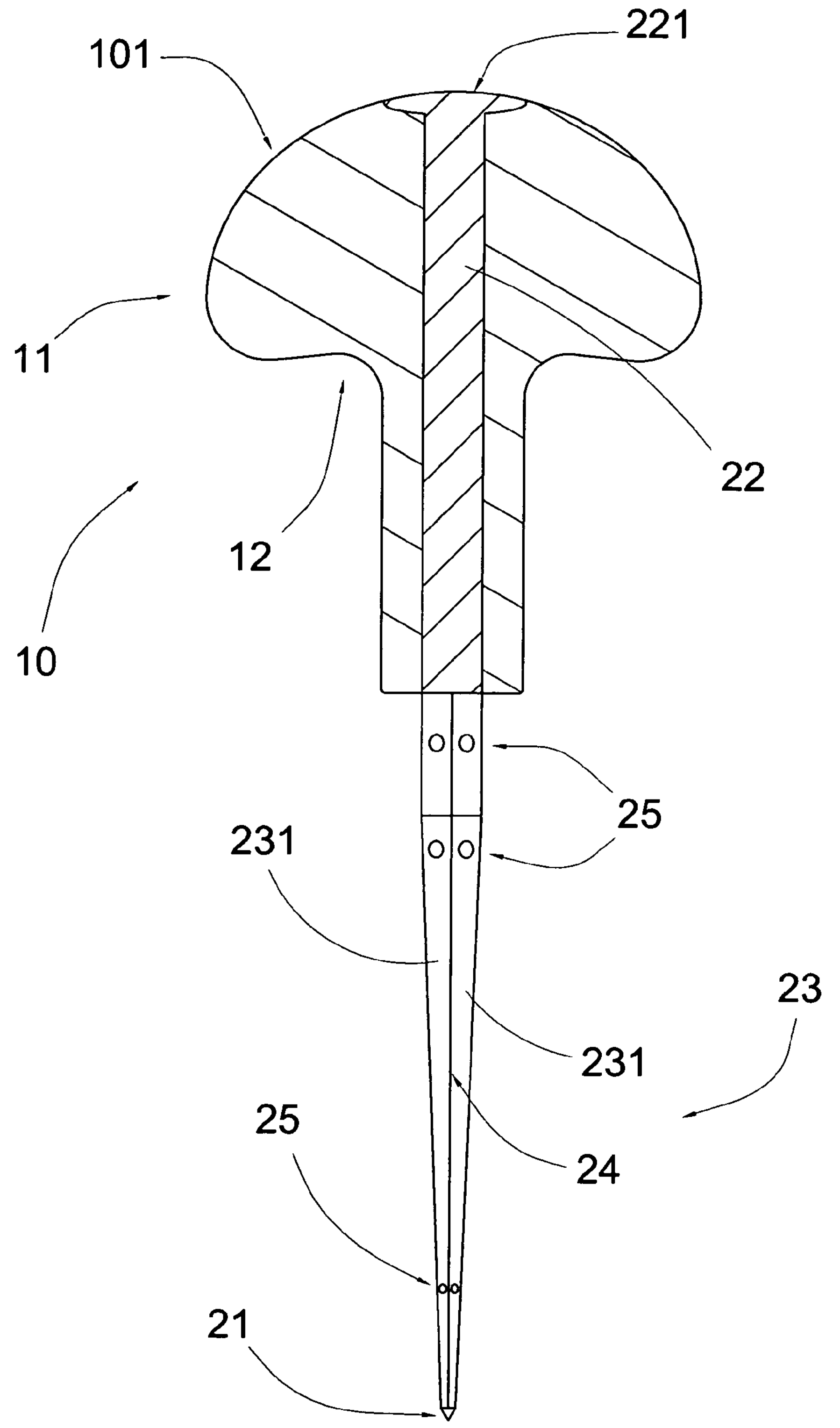
FIG. 3 is a sectional view of the dry wall hand tool according to the above first preferred embodiment of the present invention.
Figure 4:
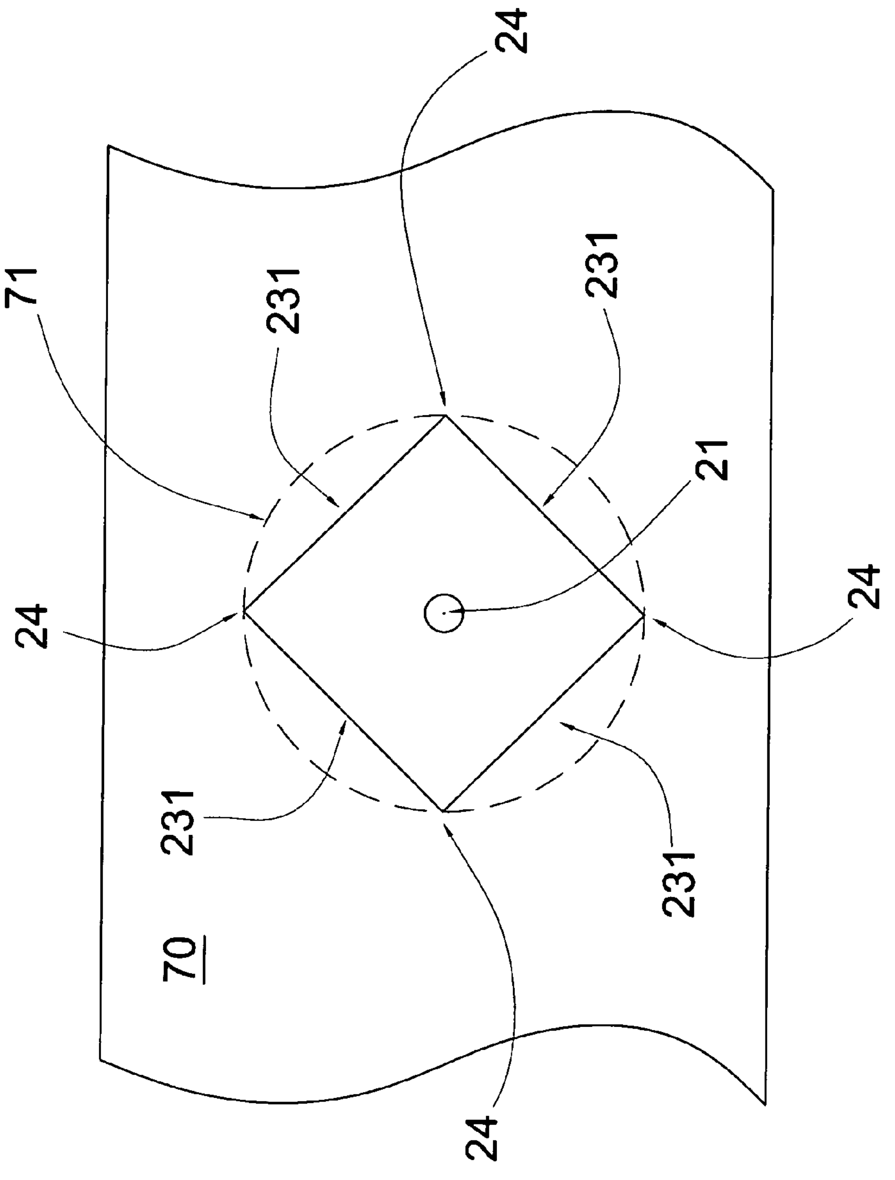
FIG. 4 is a cross-sectional view of the penetrating pin of the dry wall hand tool according to the above first embodiment of the present invention, illustrating the circular hole being formed on the dry wall by the non-circular penetrating pin.

Referring to FIGS. 2 to 4 of the drawings, a dry wall hand tool adapted for making a hole 71 on a dry wall 70 according to a preferred embodiment of the present invention is illustrated, wherein the dry wall hand tool comprises a pusher handle 10 and a penetrating pin 20.

According to the first embodiment, the pusher handle 10 is adapted for a user grabbing and holding thereat in a tight and stable manner, wherein the pusher handle 10 has an enlarged pusher head 11 and a control portion 12 extended from the enlarged pusher head 11 for accommodating corresponding fingers of the user so as to enable the user grabbing and holding at the pusher handle 10 in a tight and stable manner. Therefore, the user is able to grab the pusher handle 10 for pushing the penetrating pin 20 towards the dry wall 70 with the optimal amount of force and at an optimal direction.

The penetrating pin 20 has a sharp penetrating tip 21, a tail end portion 22 securely and coaxially coupling with the pusher handle 10, an elongated pin body 23 integrally extended from the tail end portion 22 to the sharp penetrating tip 21, and a sharp edge 24 integrally extended along the pin body 23 from the sharp penetrating tip 21 towards the tail end portion 22, in such a manner that when a pushing hand-force is applied by a hand of the user at the pusher handle 10 coaxially towards the penetrating pin 20, the sharp penetrating tip 21 of the penetrating pin 20 is arranged to initially penetrate into the dry wall 70 while the sharp edge 24 of the penetrating pin 20 is arranged to substantially assist the pin body 23 in breaking through the dry wall 70 to form the hole 71 thereat in a tool-less manner.

Accordingly, the pusher handle 10, which is made of plastic, wooden or metallic materials, is ergonomically designed and crafted to allow the user to stably and effectively apply optimal amount of pressure for pressing the penetrating pin 20 toward the dry wall 70 in an optimally coaxial manner. More specifically, the enlarged pusher head 11 has a rounded exterior contour for allowing the user to use his or her palm for applying pressure towards the dry wall 70 without imparting a significant amount of pain onto that corresponding finger. On other words, the user may use two of his fingers (such as the index finger and the middle finger) to hold the pusher handle 10 and control the direction and stability of the applied pressure, and one of his thumb palm to exert a predetermined or a desirable amount of force toward the penetrating pin 20 so as to apply the corresponding amount of pressure against the dry wall 70. It is important to mention that when the pusher handle 10 is properly held by the user, he or she is able to exert a coaxial force with respect to the penetrating pin 20 for effectively and efficiently penetrating the dry wall 70.

The penetrating pin 20 is made of strong metallic materials such as stainless steel and adapted for penetrating through the dry wall 70. Accordingly, the sharp edge 24 of the penetrating pin 20 is a straight edge extended along the pin body 23 from the sharp penetrating tip 21 towards the tail end portion 22.

As shown in FIGS. 3 and 4, the pin body 23, having a non-circular cross section, has a plurality of flat surfaces 231 to define the sharp edge 24 along a common line between the two adjacent flat surfaces 231. More specifically, the pin body 23 has a quadrilateral cross section defining four of the flat surfaces 231 and four of the sharp edges 24, wherein the sharp penetrating tip 21 of the penetrating pin 20 has a conical shape. Therefore, when the penetrating pin 20 is penetrated into the dry wall 70, the hole 71 with the quadrilateral shape is formed. Once the pin body 23 is penetrated into the dry wall 70, a rotational hand force is applied at the pusher handle 10 to drive the pin body 23 to rotate, such that the sharp edge 24 of the penetrating pin 20 abrades at the dry wall to form the hole 71 in circular shape. In other words, the user is able to choose the shape of the hole 71 by only pushing the penetrating pin 20 into the dry wall 70 or by consequently pushing and rotating the penetrating pin 20 into the dry wall 70.

It is worth to mention that the non-circular cross sectional pin body 23 is adapted to maintain secure engagement between the penetrating pin 20 and the dry wall 70 after penetration thereof. It is important to mention that when the pin body 23 is having a non-circular cross section (such as the quadrilateral cross section mentioned above), it would be very easy and convenient for the pin body 23 to break the relevant portion of the dry wall 70 when it is rotatably driven to penetrate it. In other words, the four sharp edges 24 are adapted to controllably and effective sever the corresponding portion of the dry wall 70 so as to allow easy and efficient penetration of the penetrating pin 20 into the dry wall 70. It is worth noting that the quadrilateral cross section can be a rectangular cross section, a square cross section or even a rhombus cross section. Other cross sectional shapes are possible, such as a triangular cross section, hexagonal cross section, as long as there is at least one sharp edge 24 formed on the pin body 23.

As shown in FIGS. 2 to 4, the pin body 23 has a circumferential size gradually reducing towards the sharp penetrating tip 21. The penetrating pin 20 further comprises a plurality of depth markers 25 spacedly provided on the pin body 23 for indicating a depth of penetration of the penetrating pin 20, wherein each of the depth markers 25 also illustrates said corresponding circumferential size of the pin body 23 in responsive to a size of the hole 71 formed on the dry wall 70. In other words, each of the depth markers 25 will show the corresponding size of the pin body 23 at the location where the depth marker 25 is positioned, so that the user may observe the diameter of the hole 71 formed on the dry wall 70 as a result of the penetration.

Moreover, the tail end portion 22 of the penetrating pin is embedded into the pusher handle 10 with a top end 221 of the penetrating pin 20 extended to contact with an outer top surface 101 of the pusher handle 10 for ensuring said pushing hand-force being coaxially transmitted to the penetrating pin

20. So a user, whenever necessary, may reinforce the penetrating force by hammering the pusher handle 10 without causing substantial damage thereof and with maximum efficiency, because the distance between the penetrating pin 20 and the hammering instrument can be minimized. It is important to emphasize, however, that one of the main features of the present invention is to provide an affixing pin which is capable of effectively and efficiency penetrating into the dry wall 70 in a tool-less manner. As a result, the hammering of the pusher handle 10 just described serves solely the purpose of reinforcing of penetration power whenever necessary.

In order to further enhance the efficiency and effectiveness of the dry wall hand tool, the sharp penetrating tip 21 of the penetrating pin 20 has a conical shape for facilitating easy initial penetration by the penetrating pin 20 into the dry wall 70. When pressured is exerted to push the penetrating pin 20 against the dry wall 70, the conically-shaped sharp penetrating tip 21, owning to its sharp structural property, will easily make an initial penetration into the dry wall 70 while the pin body 23 having the non-circular cross section will continue effective and efficient penetration of the dry wall 70 once the initial penetration is made.

Finally, each of the outer surfaces of the pin body 23 is slanted with respective to horizontal so that the overall diameter of the pin body 23 at any given height thereof is increasing with decreasing distance to the pusher handle 10.

Figure 5:
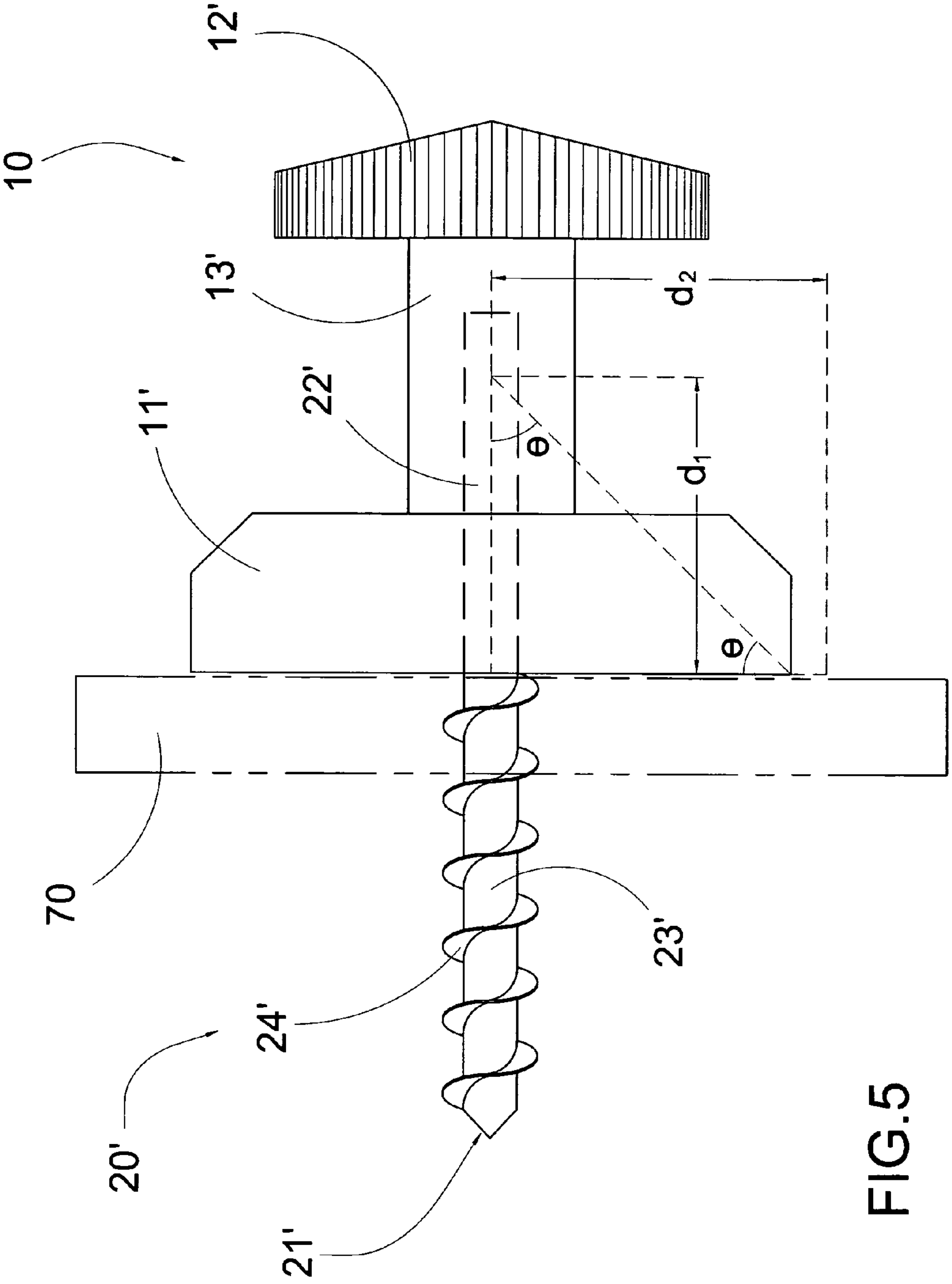
FIG. 5 is a sectional view of the dry wall hand tool according to a second preferred embodiment of the present invention.

As shown in FIG. 5, a dry wall hand tool of a second embodiment illustrates an alternative mode of the first embodiment, wherein the dry wall hand tool of the second embodiment comprises a pusher handle 10' and a penetrating pin 20'.

According to the second embodiment, the pusher handle 10' is adapted for a user grabbing and holding thereat in a tight and stable manner.

The penetrating pin 20' has a sharp penetrating tip 21', a tail end portion 22' securely and coaxially coupling with the pusher handle 10', an elongated pin body 23' integrally extended from the tail end portion 22' to the sharp penetrating tip 21', and a sharp edge 24' integrally extended along the pin body 23' from the sharp penetrating tip 21' towards the tail end portion 22', in such a manner that when a pushing hand-force is applied by a hand of the user at the pusher handle 10' coaxially towards the penetrating pin 20', the sharp penetrating tip 21' of the penetrating pin 20' is arranged to initially penetrate into the dry wall 70 while the sharp edge 24' of the penetrating pin 20' is arranged to substantially assist the pin body 23' in breaking through the dry wall 70 to form the hole 71 thereat in a tool-less manner.

As shown in FIG. 5, the pusher handle 10' comprises an inner handle member 11', an outer handle member 12' and a hanger member 13' extended between the inner handle member 11' and the outer handle member 12', wherein the pusher handle 10' is adapted for accommodating corresponding fingers of the user so as to enable the user grabbing and holding at the pusher handle 10' in a tight and stable manner. Therefore, the user is able to grab the pusher handle 10' for pushing the penetrating pin 20' towards the dry wall 70 with the optimal amount of force and at an optimal direction. In addition, the hanger member 13' is adapted for allowing a user to hang an external object at the dry wall 70 after the pin body 23' is penetrated into the dry wall 70.

The penetrating pin 20' is made of strong metallic materials such as stainless steel and adapted for penetrating through the dry wall 70. The pin body 23', having a circular cross section, has a uniform diameter extended from the sharp penetrating tip 21' towards the tail end portion 22'. The sharp edge 24' of the penetrating pin 20' is integrally protruded from an outer surface of the pin body 23' and is extended along the pin body 23' from the sharp penetrating tip 21' to the tail end portion 22' in a spiral manner. Accordingly, the spiral sharp edge 24' is adapted to facilitate easy penetration of the penetrating pin 20' into the dry wall 70, in such a manner that when the penetrating pin 20' is rotatably pressed towards the dry wall 70 by the pusher handle 10', the sharp penetrating tip 21' is arranged to penetrate the dry wall 70 in a tool-less manner, in which the spiral sharp edge 24' substantially assists in optimally breaking the dry wall 70 so as to maintain an optimal performance of the present invention in penetrating the dry wall 70 while maintaining secure engagement between the penetrating pin 20' and the dry wall 70 after penetration thereof.

In order to further enhance the efficiency and effectiveness of the dry wall hand tool, the sharp penetrating tip 21' of the penetrating pin 20' has a conical shape for facilitating easy initial penetration by the penetrating pin 20' into the dry wall 70. When pressured is exerted to push the penetrating pin 20' against the dry wall 70, the conically-shaped sharp penetrating tip 21', owning to its sharp structural property, will easily make an initial penetration into the dry wall 70 while the pin body 23' will continue effective and efficient penetration of the dry wall 70 in a rotational manner once the initial penetration is made.

According to preferred embodiment, the pusher handle 10', which can be made of plastic, wooden or metallic materials, is ergonomically designed and crafted to allow the user to stably and effectively apply an optimal amount of pressure for pressing the penetrating pin 20' toward the dry wall 70 in an optimally coaxial manner. The pusher handle 10' is adapted for not only being grabbed by the hand of the user but also for allowing the user to hang an external object, such as a cap, on it. More specifically, as shown in FIG. 5 of the drawings, in order to maximize the sustainability of the external object by the affixing pin, a perpendicular distance ($d_1$) between the outer handle member and a mid-point of the hanger member 13' is equal the distance ($d_2$) between that mid-point of the hanger member 13' and an outer corner tip of the hanger member 13' such that the angle of inclination θ between $d_1$ and $d_2$ is approximately 45 degrees.

One skilled in the art will understand that the embodiment of the present invention as shown in the drawings and described above is exemplary only and not intend portioned to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A dry wall hand tool for making a circular hole on a dry wall, comprising:
   - a pusher handle adapted for a user grabbing and holding thereat in a tight and stable manner; and
   - a penetrating pin having a sharp penetrating tip of a conical shape, a tail end portion securely coupling with said pusher handle, and an elongated pin body integrally extended from said tail end portion to said sharp penetrating tip, wherein said pin body has a square cross section and defines four equal sized flat surfaces and four sharp edges, and has a circumferential size gradually reducing towards said sharp penetrating tip, wherein each of said sharp edges is a straight edge and is formed along a common line between each two of said adjacent flat surfaces and is integrally extended along said pin body from said sharp penetrating tip toward said tail end portion, wherein said sharp penetrating tip of said penetrating pin is arranged for initially penetrating into said dry wall when a pushing hand-force is applied by a hand of said user at said pusher handle towards said penetrating pin, wherein said sharp edge of said penetrating pin is arranged for substantially assisting said pin body in breaking through said dry wall to form a square shaped hole thereat, wherein said flat surfaces of said pin body is arranged for maintaining secure engagement between said penetrating pin and said dry wall after said sharp penetrating tip is penetrated into said dry wall, wherein said sharp edges of said penetrating pin is arranged for abrading at said dry wall to form said circular hole when a rotational hand force is applied at said pusher handle to drive said pin body to rotate.

2. The drywall hand tool, as recited in claim 1, wherein said penetrating pin further comprises a plurality of depth markers spacedly provided at said pin body for indicating a depth of penetration of said penetrating pin and for illustrating a size of said circular hole formed on said dry wall when said penetrating pin is driven to rotate.

3. The dry wall hand tool, as recited in claim 1, wherein said pusher handle has an enlarged pusher head and a control portion extended from said enlarged pusher head for accommodating corresponding fingers of said user so as to enable said user grabbing and holding at said pusher handle in a tight and stable manner.

4. The dry wall hand tool, as recited in claim 2, wherein said pusher handle has an enlarged pusher head and a control portion extended from said enlarged pusher head for accommodating corresponding fingers of said user so as to enable said user grabbing and holding at said pusher handle in a tight and stable manner.

5. A method of making a circular hole on a dry wall by a dry wall hand tool which comprises a pusher handle and a penetrating pin extended therefrom, wherein the method comprises the steps of:

(a) applying a pushing hand-force by a hand of said user at said pusher handle towards said penetrating pin to initially penetrate a sharp penetrating tip of said penetrating pin into said dry wall;

(b) pushing said penetrating pin into said dry wall until an elongated pin body of said penetrating pin penetrates into said dry wall, wherein said pin body, which is integrally extended from said sharp penetrating tip, has a square cross section and defines four equal sized flat surfaces and four sharp edges, and has a circumferential size gradually reducing towards said sharp penetrating tip, wherein each of said sharp edge is formed along a common line between each two of said adjacent flat surfaces and is integrally extended along said pin body from said sharp penetrating tip, wherein said sharp edge of said penetrating pin is arranged for substantially assisting said pin body in breaking through said dry wall to form a square shaped hole thereat, wherein said flat surfaces of said pin body is arranged for maintaining secure engagement between said penetrating pin and said dry wall after said sharp penetrating tip is penetrated into said dry wall; and (c) applying a rotational hand force at said pusher handle to drive said pin body to rotate, wherein said sharp edges of said penetrating pin is arranged for abrading at said dry wall to form said circular hole.

6. The method, as recited in claim 5, wherein the step (b) further comprises a step of penetrating said pin body of said pin penetrates into said dry wall at one of depth markers to indicate a depth of penetration of said penetrating pin, wherein said depth markers are spacedly provided at said pin body, such that when said penetrating pin is driven to rotate in the step (c), a desired diameter of said circular hole is formed corresponding to said depth marker.

* * * * *